(12) United States Patent
Anderson et al.

(10) Patent No.: US 9,522,489 B2
(45) Date of Patent: Dec. 20, 2016

(54) SUBSTRATE-FREE DECORATIVE SURFACE COVERING

(75) Inventors: Tommy Anderson, Ronneby (SE); Stefan Karlsson, Ronneby (SE); Paul Martin, Lenham Maidston (GB)

(73) Assignee: Tarkett France, Nanterre (FR)

( * ) Notice: Subject to any disclaimer, the term of this patent is extended or adjusted under 35 U.S.C. 154(b) by 651 days.

(21) Appl. No.: 13/057,522

(22) PCT Filed: Aug. 3, 2009

(86) PCT No.: PCT/EP2009/060017
§ 371 (c)(1),
(2), (4) Date: Mar. 31, 2011

(87) PCT Pub. No.: WO2010/018096
PCT Pub. Date: Feb. 18, 2010

(65) Prior Publication Data
US 2011/0177308 A1    Jul. 21, 2011

(30) Foreign Application Priority Data
Aug. 14, 2008   (EP) ..................................... 08162376

(51) Int. Cl.
| B32B 3/10 | (2006.01) |
| B29C 43/30 | (2006.01) |
| B44C 3/12 | (2006.01) |
| E04F 15/10 | (2006.01) |
| B29L 31/30 | (2006.01) |
| B29L 31/00 | (2006.01) |

(52) U.S. Cl.
CPC ............... *B29C 43/30* (2013.01); *B44C 3/12* (2013.01); *E04F 15/10* (2013.01); *B29C 2793/0081* (2013.01); *B29K 2995/0021* (2013.01); *B29L 2031/3017* (2013.01); *B29L 2031/722* (2013.01); *B29L 2031/732* (2013.01); *Y10T 428/24901* (2015.01)

(58) Field of Classification Search
CPC ............................................... E04F 2019/0454
See application file for complete search history.

(56) References Cited

U.S. PATENT DOCUMENTS

| 1,691,708 | A | * | 11/1928 | Egleson | .......................... 428/163 |
| 3,038,828 | A | | 6/1962 | Yakubik | |
| 3,267,187 | A | | 8/1966 | Slosberg et al. | |
| 3,272,683 | A | | 9/1966 | Marcus et al. | |
| 3,499,956 | A | | 3/1970 | Mountain | |
| 3,540,411 | A | * | 11/1970 | Gamble et al. | ............... 118/311 |
| 4,396,566 | A | | 8/1983 | Brinkmann et al. | |
| 5,059,471 | A | * | 10/1991 | McNally et al. | ............. 428/143 |
| 5,891,564 | A | * | 4/1999 | Shultz | ................... B29C 43/222 |
| | | | | | 428/324 |

FOREIGN PATENT DOCUMENTS

WO    WO 2006/072638 A1    7/2006

* cited by examiner

*Primary Examiner* — Galen Hauth
(74) *Attorney, Agent, or Firm* — Reinhart Boerner Van Deuren P.C.

(57) ABSTRACT

The present invention relates to a process to manufacture a substrate-free decorative surface covering, having a relief-like pattern, comprising a non-uniform arrangement of unfused and discrete colored polymer-based particles (9, 10), the particles are obtained by the shredding of a polymer based sheet, and the particles are non-uniformly embedded in, and principally surrounded by, a substantially transparent or translucent polymeric matrix 12.

14 Claims, 3 Drawing Sheets

SUBSTRATE-FREE DECORATIVE SURFACE COVERING

SUBJECT OF THE INVENTION

The present invention relates to a substrate-free decorative surface covering having three-dimensional 10 design pattern, and a process to manufacture such surface coverings.

PRIOR ART

Surface coverings such as multiple-layer coverings and substrate-free coverings are well known by those skilled in the art.

Decorative multiple layers coverings are heterogeneous coverings and multilayer composites, comprising generally a backing layer, usually called "substrate", and different layers made of distinctive and different composition, commonly, PVC-based or polyolefin-based layers. Generally, the substrate is a non-woven or woven fabric, felt, rubber, compact or foamable resin-based layer.

Substrate-free surface coverings (also called "homogeneous" coverings) are coverings which do not comprise a backing layer (or substrate). Such coverings comprise a single layer of polymer particles and are produced by agglomerating these particles using heat and pressure, in a double belt press device for instance, enabling the particles to fuse together to form a homogeneous sheet.

An example of a process to produce substrate-free surface covering is described in U.S. Pat. No. 4,396,566, in which thermoplastic synthetic resin particles are applied to a moving support, passed through a heating zone, compacted and welded under pressure, and then cooled simultaneously under pressure.

The particles used to produce substrate-free coverings can be coloured and may comprise one or more different colours. They may have different shape. They may be present, for example, in the form of shreds, crumbs, chips, flakes, pebbles or granules. The particles may also have different size. Particularly, WO 2006/072638 describes a process to manufacture a substrate-free surface covering in which at least 10% of the particles used have a length 30 times greater then their thickness.

However, the visual appearance of the decorative pattern of the resulting covering is generally flat and lacking in depth. Therefore, one drawback of substrate-free surface coverings is their visual aspect. Indeed, if the polymer particles are of one colour, the covering will present a uniform aspect, which can however, be marbled using particles of different colours, but such covering will never present a relief-like appearance effect.

U.S. Pat. No. 3,038,828 discloses a decorative floor or wall covering comprising particles of thermo-flowable plastic material agglomerated, and a transparent film covering the particles, and the interstices between the particles, at the surface of the floor or wall covering.

U.S. Pat. No. 3,267,187 discloses a rubber-based surface covering comprising pigmented rubber chips uniformly dispersed and incorporated in a transparent resin, the sheet surface having a textured effect, i.e. irregular undulations in the surface.

AIMS OF THE INVENTION

The present invention provides a substrate-free decorative surface covering, and a process to manufacture it, that does not have the drawbacks of the prior art.

It provides in particular a substrate-free decorative surface covering presenting, in spite of its homogeneous overall thickness, a relief-like appearance.

It provides a substrate-free decorative surface covering which is an alternative to the surface coverings of the prior art having a relief-like appearance.

It provides a substrate-free decorative surface covering presenting an enhanced relief-like appearance effect.

The present invention provides also a process to manufacture a surface covering that does not have the drawbacks of the prior art.

It provides in particular a process to manufacture a substrate-free decorative surface covering presenting, in spite of its homogeneous overall thickness, a relief-like appearance.

SUMMARY OF THE INVENTION

The present invention describes a process to manufacture a substrate-free decorative surface covering comprising a three dimensional pattern, which comprises the steps of:
  manufacturing a colored polymer-based sheet,
  cutting said sheet into particles,
  depositing said particles onto a band-shaped moving carrier (3),
  depositing a polymer based substantially pigment-free and filler-free powder onto said particles,
  heat treating said particles and said substantially pigment and filler-free powder and compacting them in a press to form said surface covering.

The "substrate-free" surface covering is a surface covering which do not comprise a backing layer (or substrate) on which the particles are poured onto, before the agglomeration process.

According to particular embodiments, the process comprises one or a suitable combination of any of the following characteristics:
  the substantially pigment- and filler-free powder represents less than 50 wt % of the total weight of the composition of the decorative surface covering,
  the process further comprises a step of sanding the back side surface of the resulting surface covering to a defined thickness,
  the dust generated at the sanding step is deposited onto the band shaped moving carrier before depositing the particles on said band shaped moving carrier,
  the process further comprises a step of coating the top of the surface covering with a polyurethane-based varnish layer.

The present invention describes also a substrate-free decorative surface covering having a relief-like pattern comprising a non-uniform arrangement of unfused and discrete colored polymer-based particles, said particles being obtained by the shredding of a polymer based sheet, and said particles being non-uniformly embedded in, and principally surrounded by, a substantially transparent or translucent polymeric matrix.

According to particular embodiments, the substrate-free decorative surface covering comprises one or a suitable combination of any of the following characteristics:
  the substantially transparent or translucent polymer matrix represents less than 50 wt % of the total weight of the composition of said substrate-free surface covering,
  the substantially transparent or translucent polymer matrix represents less than 20 wt % of the total weight of the composition of said substrate-free surface covering, the particles are rubber-based, PVC-based or polyolefins-based particles, the particles are made of polyethylene (PE), polyethylene-co-octene (PE-co-O), polypropylene (PP), styrene-butadiene-styrene (SBS), styrene-ethylene-butadiene-styrene (SEBS), ethylene-vinyl acetate (EVA) or ethylene-butyl acrylate (EBA), the particles are made of polyolefin ionomers, the substantially pigment and filler-free powder is a PVC-based or polyolefin-based powder.

DETAILED DESCRIPTION OF THE INVENTION

A decorative surface covering, in particular a floor covering, presents specific mechanical properties, particularly in terms of mechanical resistance, wear and indentation resistance, but also in terms of comfort, softness, sound and heat insulation.

Figure 4:
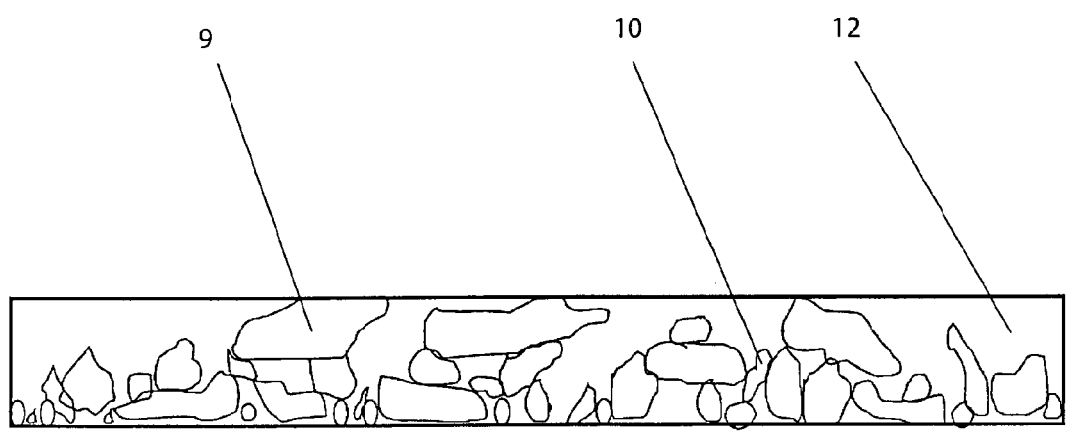
FIG. 4 is a schematic representation of a cross-section view of a decorative surface covering having a relief-like appearance.

The substrate-free surface covering of the present invention combines the mechanical properties of such substrate-free surface covering with an outstanding esthetical aspect since it presents a relief-like appearance due to the visual appearance given by unfused particles 9 and 10 embedded in a substantially transparent polymeric matrix 12 (FIG. 4).

To manufacture the decorative surface covering according to the present invention a colored sheet of a composition comprising a polymer is manufactured and then granulated, or shredded, into particles. Preferably, the sheet is manufactured by calendering from a continuous polymer stream coming from an extruder device.

Preferably, the particles are made of rubber based materials, PVC or Polyolefin. More preferably, the particles are made of polyethylene (PE), polyethylene-co-octene (PE-co-O), polypropylene (PP), styrene-butadiene-styrene (SBS), styrene-ethylene-butadiene-styrene (SEBS), ethylene-vinyl acetate (EVA), or ethylene-butyl acrylate (EBA).

The particles composition may further comprise filler, stabilizer, antioxidant, matting agent, pigments, or a mixture thereof. A PVC-based composition may further comprise a plasticizer.

Preferably, the filler represents between 0 and 200 Phr, the stabilizer between 0.5 and 5 Phr, the pigment between 0 and 10 Phr, the plasticizer between 10 and 60 Phr, the unit "Phr" meaning "proportion by weight", with respect to 100 parts of the polymer (PVC or polyolefin).

Typical particle compositions are given in tables 1 and 2. The PVC type such as the type of stabilizer, plasticizer, filler and pigments are adapted for each application and depends on various parameters such as on the relief effect to be obtained, particle size, colour, transparency, etc.

TABLE 1

PVC-based particles compositions.

| | Particles 1 in Phr | Particles 2 in Phr | Particles 3 in Phr |
|---|---|---|---|
| PVC | 100 | 100 | 100 |
| Plasticizer | 40 | 30 | 50 |
| Stabilizer | 3 | 2 | 4 |
| Fillers | 60 | 20 | 150 |
| Pigment | 4 | 1 | 7 |

TABLE 2

Polyolefin-based particles compositions.

| | Particles A in Phr | Particles B in Phr | Particles C in Phr |
|---|---|---|---|
| Polyolefin | 100 | 100 | 100 |
| Stabilizer | 2 | 1 | 1 |
| Fillers | 50 | 0 | 150 |
| Pigment | 4 | 5 | 3 |

As an example, the PVC polymer is the one from Hydro Polymers, Ineos, Georgia Gulf or Solvin. Preferably, the polyolefin polymer is polyethylene or polyethylene co-octene (PE-co-O), for example Affinity™ EG 8100 from Dow Chemical.

The filler is any suitable filler. Preferably, it is selected among hydrates, oxides, clays, carbonates, dolomite or talc or a mixture thereof. As an example, the filler is dolomite (Myanite A20) from Omya AB, chalk as Danchalk® P from Dankalk or as Reosorb 90 from Omya AB.

The stabilizer is any suitable stabilizer. Preferably, it is a Ca—Zn stabilizer, for example the Ca—Zn stabilizer from Akcros or from Bärlocher GmbH.

The pigment is any suitable pigment only limited to aesthetic considerations. Preferably, it is titanium dioxide, C.I. Red 144, C.I. Blue 15:1, C.I. Black 7, C.I. Green 7, C.I. Yellow 83 or C.I. Violet 23. For example, titanium dioxide is Kemira 660 from Kemira Pigments, Tiona® 168 from Millenium Chemicals or Tronox® R-FK-3 from IMCD Sweden AB, the Blue 15:1 is Irgatith Blue BCA from Ciba or the PV Fast Blue from Clariant, the C.I. Red 144 is Cromophtal® Red BRNP from Ciba, and C.I. Black 7 is Printex® U from Evonik.

The plasticizer is any suitable plasticizer. Preferably it is DINP (Di-isononylphtalate) or DIDP (Di-isodecylphtalate), for example from Exxon Mobile or Oxeno GmbH.

The particles produced may have any suitable colour. Preferably, one polymer composition with a single colour gives a single-colour polymer sheet which is shredded into single-colour particles. To obtained particles with a marbling effect, a polymer sheet can be produced from at least two polymer streams from different colours.

The particles produced are in different shapes or sizes. They may be in the form of shreds, crumbs, chips, flakes, pebbles, granules or a mix thereof. They may have any suitable size and thickness. Preferably, the particles have a size lower than 14 mm, more preferably lower then 10 mm, and even more preferably lower then 6 mm. The expression "shredded particles" should be understood as particles that have been obtained by any cutting means in its general sense. Preferably, before being scattered onto the band-shaped moving carrier 3 of a calendering device, the particles pass trough a grid of a suitable size to select and deposit only the particles of the desired size.

The substantially pigment- and filler-free powder, which is subsequently deposited onto the above described particles, is any suitable polymer-based powder allowing getting a transparent or translucent polymeric matrix. The polymer, used in the dry blend powder, is generally amorphous or semi-crystalline to obtain a transparent or translucent polymeric matrix. However, the substantially pigment- and filler-free powder may comprise a very small quantity of matting agent, pigment or filler but the transparency should be respected to guarantee a 3-dimensional optic effect.

The substantially pigment- and filler-free powder comprises a particle size lower then the one of the shredded sheet particles. Preferably, the particle size of said pigment- and filler-free powder is between 1 and 300 µm.

Preferably, the substantially pigment- and filler-free powder is a PVC-based or a polyolefin-based composition. A preferred polyolefin is polyethylene or a co-polymer thereof.

The substantially pigment- and filler-free powder may further comprise a plasticizer, a stabilizer, an additive, or a mixture thereof.

The stabilizer may preferably represent between 0.5 and 5 Phr, the additive between 0 and 10 Phr. For a PVC-based composition, the plasticizer may preferably represent between 5 and 50 Phr.

To get a transparent or translucent polymeric matrix wherein the unfused particles are embedded, the substantially pigment- and filler-free powder may only comprise a small quantity of pigment or filler. Preferably, the pigment or the filler represents less than 2 Phr.

Typical substantially pigment- and filler-free powder compositions are given in tables 3 and 4.

TABLE 3

PVC-based substantially pigment- and filler-free powder compositions

|  | Powder 1 in Phr | Powder 2 in Phr | Powder 3 in Phr | Powder 4 in Phr | Powder 5 in Phr |
|---|---|---|---|---|---|
| PVC | 100 | 100 | 100 | 100 | 100 |
| plasticizer | 35 | 40 | 40 | 5 | 50 |
| Stabilizer | 2.5 | 2 | 2 | 1 | 3 |
| Pigment | 0 | 0 | 1 | 1 | 0 |
| Additive (except filler) | 0 | 0 | 1 | 3 | 0 |

TABLE 4

Polyolefin-based substantially pigment- and filler-free powder compositions

|  | Powder A in Phr | Powder B in Phr | Powder C in Phr |
|---|---|---|---|
| Polyolefin | 100 | 100 | 100 |
| Stabilizer | 2 | 2 | 1 |
| Pigment | 0 | 1 | 0 |
| Additive (except filler) | 0 | 1 | 3 |

As example, the PVC polymer is the one from Hydro Polymers, Ineos, Georgia Gulf or Solvin. The polyolefin polymer is polyethylene or polyethylene co-octene (PE-co-O), for example Affinity™ EG 8100 from Dow Chemical.

The stabilizer is any suitable stabilizer. Preferably, it is a Ca—Zn stabilizer, for example the Ca—Zn stabilizer from Akcros or from Bärlocher GmbH.

The plasticizer is any suitable plasticizer. Preferably it is DINP (Di-isononylphtalate) or DIDP (Di-isodecylphtalate), for example from Exxon Mobile or Oxeno GmbH.

Preferably, the additive is a compatibilizer or an antioxidant. The antioxidant is Irganox® 1010 (antioxidant) from Ciba.

Preferably, the pigment is titanium dioxide, C.I. Red 144, C.I. Blue 15:1, C.I. Black 7, C.I. Green 7, C.I. Yellow 83 or C.I. Violet 23. For example, the titanium dioxide is Kemira 660 from Kemira Pigments, Tiona® 168 from Millenium Chemicals or Tronox® R-FK-3 from IMCD Sweden AB, the Blue 15:1 is Irgatith Blue BCA from Ciba or the PV Fast Blue from Clariant, the C.I. Red 144 is Cromophtal® Red BRNP from Ciba, and C.I. Black 7 is Printex® U from Evonik.

The substrate-free decorative surface covering according to the invention is obtained by depositing, preferably by scattering, the particles onto a band-shaped moving carrier 3 and by depositing the polymer based substantially pigment-free and filler-free powder onto the moving carrier comprising the particles. Thus, the substantially pigment- and filler-free powder covers the particles and fills the space, or interstices, between the particles through the overall thickness of the layer formed by the particles.

The particles and the substantially pigment- and filler-free powder are then heated and compacted, for example in a double belt press, to form the substrate-free surface covering.

Figure 3:
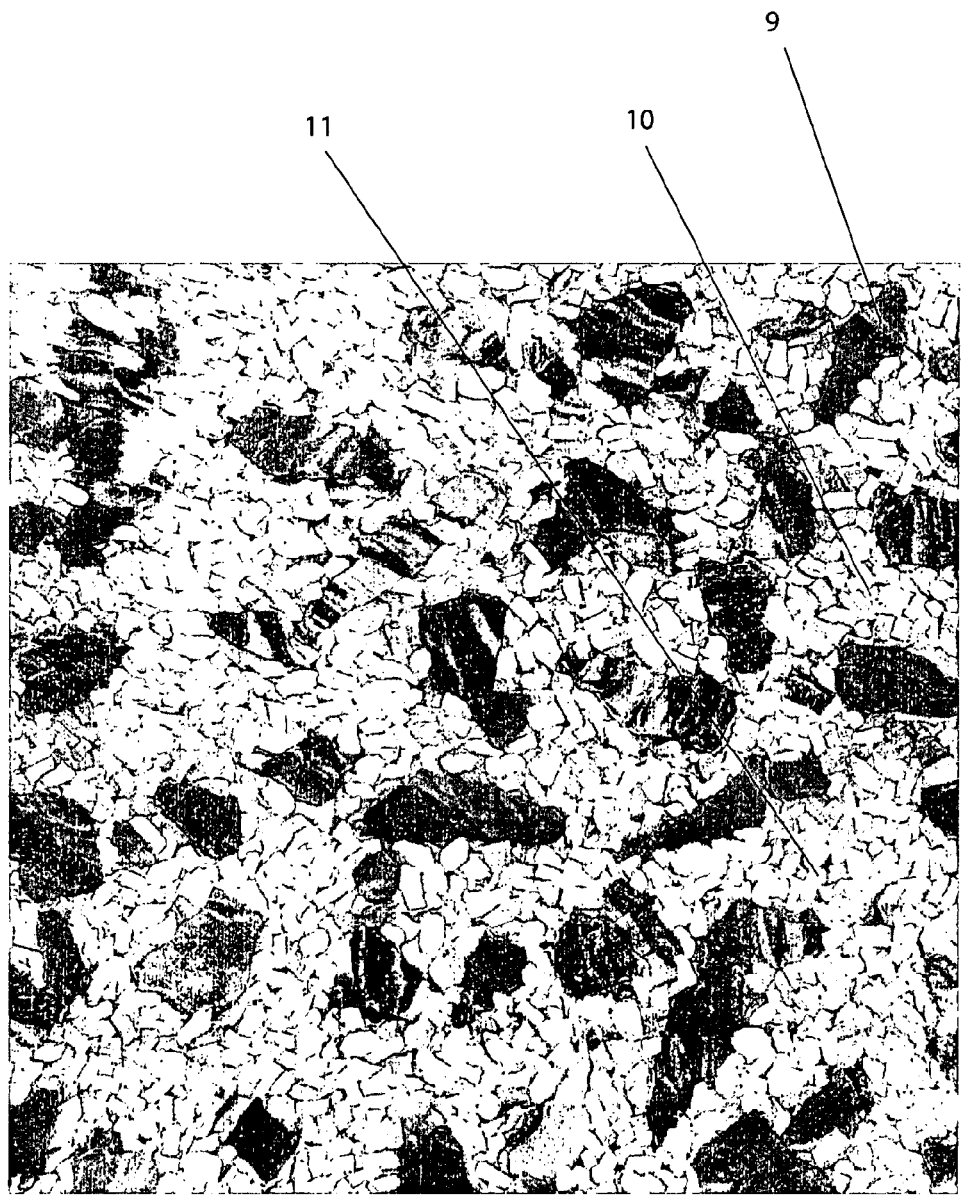
FIG. 3 represents a decorative surface covering having a relief-like appearance.

The heating treatment transform the powder into a transparent or translucent polymeric matrix 12 embedding the unfused and discrete particles 9 and 10 (FIG. 3).

The two steps of scattering of the particles on the one hand and subsequently depositing the substantially pigment and filler-free powder on the other hand, allows control of the density and the distribution of the particles onto the band-shaped moving carrier, and thus in the 10 surface covering. It enables the obtainment of a non-uniform distribution of the particles through the overall thickness and/or the length of the surface covering (FIG. 4). It allows the substantially pigment- and filler-free powder to penetrate through the all thickness 15 of the layer formed by the particles and to fill the interstices between the particles through the overall thickness.

In the surface covering according to the invention, the particles are not agglomerated to each-other. In the overall thickness and/or length, the particles appear to be discrete. They appear as suspended or hanged into the transparent or translucent polymeric matrix 12. The particles may touch, or be in contact, one to another, but they are principally surrounded by the matrix formed by the pigment- and filler-free powder.

Preferably, the substantially pigment- and filler-free powder represents less than 50 wt % of the total weight of the composition of the surface covering. More preferably, the particles represent more than 90 wt % and the substantially pigment- and filler-free powder less than 10% wt.

Figure 1:
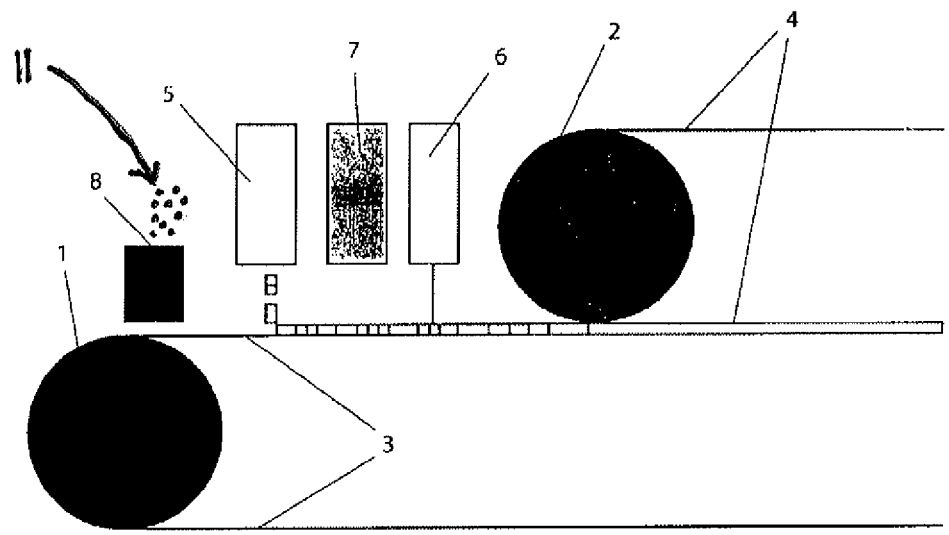
FIG. 1 is a schematic representation of a double belt press device to manufacture a substrate-free surface covering according to a first embodiment of the invention.
Figure 2:
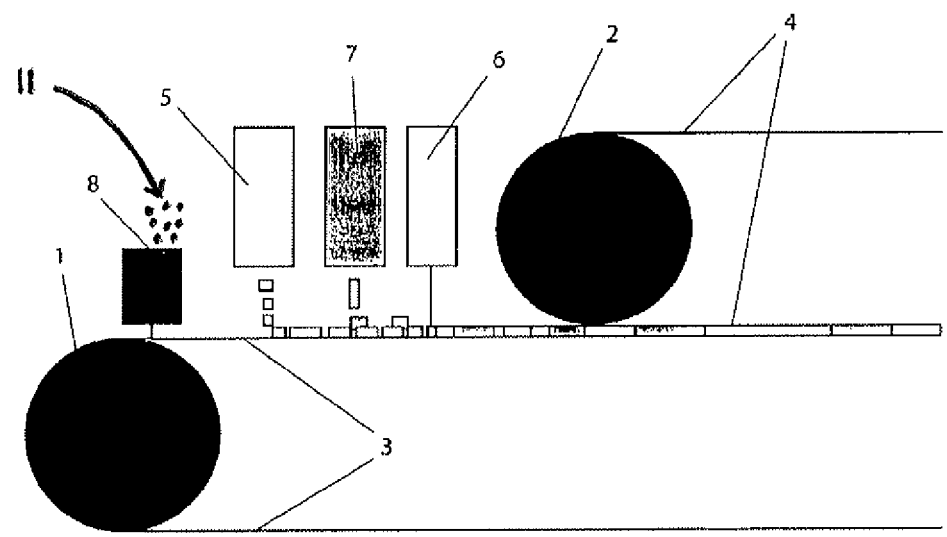
FIG. 2 is a schematic representation of a double belt press device to manufacture a substrate-free surface covering according to a second embodiment of the invention.

The substrate-free surface covering according to the invention is produced using any suitable device. Preferably, as shown in FIGS. 1 and 2, it is produced using a double belt press comprising a band-shaped moving carrier 3 (or lower belt) made of steel or comprising a release paper for example, a roller 1 moving the lower belt 3, a roller 2 moving a upper belt 4, said roller 2 being heated and operating at a temperature between 160 and 200° C. and a pressure of between 0.5 and 25 bars.

Preferably, the deposition of the particles is performed by at least a device 5 or 7 which scatters the particles onto the moving carrier 3 in a quantity of between 1.5 and 5 Kg/m². Preferably, the devices 5 and 7 comprise a grid, for example a 10 mm grid, to deposit only the particles of the desired size.

The diameter of the particles is any suitable diameter, depending on the 3D visual effect desired. However, the thickness of the particles is preferably between 0.5 and 3 mm.

Each of the devices 5 and 7 is fed with single size particles or with a mixture of particles having different size or shape. Each of the devices 5 and 7 is fed with single color particles, or with marbled particles, or with a mixture of particles of different colors. Each of the devices 5 and 7 may also be fed with single size particles of one color or of different colors, or multiple size particles of one color or of different colors.

Preferably, the deposition of the substantially pigment- and filler-free powder is performed by a device 6 which scatters the powder onto the moving carrier 3 and the particles in a quantity of between 0.1 and 1 Kg/m².

In a first embodiment (FIG. 1) the particles are scattered onto the lower belt 3 using the device 5 and the substantially pigment- and filler-free powder is scattered onto the particles bed using the device 6. In a second embodiment (FIG. 2) the particles are scattered onto the lower belt 3 using the device 5 and 7. Subsequently, the particles and the powder are heat pressed between lower belt 3 and upper belt 4.

Preferably, the back side of the resulting substrate-free surface covering is sanded to adjust the thickness of the surface covering to a defined value. Preferably, around 0.2 mm of the back side is removed, the final thickness of the surface covering being between 1.9 and 2.2 mm.

To produce substrate-free surface covering according to the present invention, no bottom layer, or substrate, is used. However, before depositing the particles onto the moving carrier, the dust 11 produced by the sanding step is deposited onto the band shaped moving carrier 3 to form a bed of around 0.2 to 3 mm. Preferably, the sanding dust is deposited using the device 8.

The substrate-free surface covering according to the present invention has flat surfaces and does not have a surface texture, or irregular undulations in the surfaces, due to the unfused particles 9, 10 embedded into the polymeric matrix 12. However, optionally, the top surface of the substrate-free covering may be embossed after the sanding step.

Preferably, the top side of the substrate-free surface covering, with or without embossment, is coated with a varnish layer, preferably a polyurethane-based layer, and more preferably UV-curable polyurethane. This top coating may comprise a PUR-dispersion, a PUR-solution, a two-component PUR, a PUR acrylate, or a mixture thereof. Preferably, the top coating have a thickness between 0.5 μm to 100 μm, and is applied by any suitable technique, but preferably by roller coating or spaying.

Preferably, the substrate-free surface covering, with or without top coating, is cut into strips or tiles.

EXAMPLES

Example 1

On a first step, three different sheets of PVC (thickness +/−3 mm), each having a specific colour, are produced using a calendaring device. The first PVC sheet comprises 48% wt PVC polymer from Hydro Polymers, 19% wt DINP (di-isononylphtalate) from Exxon Mobile as plasticizer, 2% wt of CaZn stabilizer from Akcros, 20% wt dolomite (Myanite A20) from Omya AB and 9% wt chalk (Danchalk® P) from Dankalk as fillers, and as pigments 1.9% wt of titanium dioxide (Kemira 660) from Kemira Pigments and 0.1% wt of C.I. Blue 15:1 (Irgatith Blue BCA) from Ciba. The second sheet as the same formulation as the first sheet, except a pigment combination of C.I. Blue 15:1 (Irgatith Blue BCA) from Ciba and C.I. Red 144 (Cromophtal® Red BRNP) from Ciba. The third sheet as the same formulation as the first sheet, except a pigment combination of C.I. Blue 15:1 Irgatith Blue BCA) from Ciba and C.I. Black 7 (Printex® U) from Evonik.

Subsequently, these sheets are shredded (granulating) into various particle sizes or shapes and passed trough a grid of 10 mm to select the particles of a size of less than 10 mm. These particles are deposited using a device 5 (feed station), at a quantity of 3 Kg/m², onto a lower steel belt of 2.5 meters wide and running at a speed of 10 meters/min to form a bed of around 10 mm.

On a subsequent feeding station 6 a free flowing substantially pigment- and filler-free PVC powder, comprising 73% PVC from Hydro Polymers, and 25% DINP (di-isononylphtalate) from Exxon Mobile as plasticizer and 2% wt of CaZn stabilizer from Akcros Chemical, is scattered onto the previous particles in a quantity of 0.3 Kg/m². The proportion of particles is 90% wt and the proportion of the dry blend is 10% wt.

The particles and the pigment-free powder are pressed at 10 bars between the lower steel belt and the upper steel belt which is heated up to 175° C. on a distance of 7 meters. After this heating process, the sheet produced is cooled down to 30° C. in the double-belt press.

The substrate-free decorative covering thus obtained has a thickness of 2.2 mm. The resulting surface covering is represented in FIG. 3.

Example 2

Example 2 is performed in the same way than example 1, except the fact that an additional step of sanding is added to the steps of Example 1. The original thickness of 2.2 mm has been reduced to 2 mm.

Example 3

Example 3 is performed in the same way than example 1, except the fact that the particles are made of polyolefin. The polyolefin sheets comprise 50 wt % PE-co-O (Affinity™ EG 8100) from Dow Chemical, 14 wt % Polypropylene (Embryon HG 245) from Borealis, 32 wt % chalk (Danchalk® P) from Dankalk, 2 wt % antioxidant (Irganox® 1010) from Ciba and the same proportion of titan dioxide and the same pigment combinations as in Example 1. The substantially pigment- and filler-free powder comprises 98 wt % PE-co-O (Affinity™ EG 8100) from Dow Chemical and 2 wt % antioxidant (Irganox® 1010) from Ciba.

Example 4 is performed in the same way than example 3, except the fact that an additional step of sanding is added. The original thickness of 2.2 mm has been reduced to 2 mm.

KEYS

1: roller
2: heated roller
3: moving carrier (lower belt)
4: upper belt
5: particles scattering device
6: pigment- and filler-free powder scattering device
7: particles scattering device 8: sanding dust scattering device
9: unfused large particles embedded in the substantially transparent polymeric matrix.
10: unfused small particles embedded in the substantially transparent polymeric matrix.
11: sanding dust
12: transparent/translucent polymeric matrix

The invention claimed is:

1. Process to manufacture a substrate-free decorative surface covering having a relief-like appearance, said process comprising the steps of:
    manufacturing a colored polymer-based sheet,
    cutting said sheet into particles,
    scattering said particles onto a band-shaped moving carrier, the band-shaped moving carrier being part of a production device,
    downstream of said scattering of said particles onto said band-shaped moving carrier, depositing a polymer based substantially pigment-free and substantially filler-free powder onto said particles, so that said powder covers said particles and fills the space or interstices between said particles; and
    heat treating said particles and said substantially pigment-free and substantially filler-free powder and compacting them in a press to form said surface covering, whereby said powder transforms into a transparent or translucent matrix in which the unfused and discrete particles are non-uniformly dispersed and embedded; the non-uniform dispersion and embedment of the unfused and discrete particles being such that the particles have a lower density towards the top surface of the transparent or translucent matrix and a higher density towards the bottom surface of the transparent or translucent matrix.

2. Process according to claim 1, wherein the substantially pigment and filler-free powder represents less than 50 wt % of the total weight of the composition of the decorative surface covering.

3. Process according to claim 1, further comprising a step of sanding the back side surface of the resulting surface covering to a defined thickness.

4. Process according to claim 3, wherein the dust generated at the sanding step is deposited onto the band shaped moving carrier (3) before depositing the particles on said band shaped moving carrier (3).

5. Process according to claim 1, further comprising a step of coating the top of the surface covering with a polyurethane-based varnish layer.

6. Process of claim 1, wherein the polymer based substantially pigment-free and filler-free powder is deposited over said band shaped moving carrier, subsequently over and on top of the particles, while being carried by the band shaped moving carrier (3).

7. Process of claim 1, wherein the depositing said particles comprises scattering said particles onto the band-shaped moving carrier (3) to obtain a non-uniform distribution of the particles through at least one of an overall thickness and length of the surface covering.

8. Process of claim 7, wherein the surface covering includes a top side and a bottom side with an upper half region along the top side, wherein the surface covering includes at least some portions of the upper half region that are free of the particles.

9. Process of claim 1, wherein the surface covering has a flat surface that is subject to a further step of an embossing operation and wherein the surface covering is cut into tiles or strips.

10. Process of claim 1, wherein the surface covering is cut into tiles or strips that have a flat surface and do not have surface texture or irregular undulations in the surfaces.

11. Process of claim 1, wherein said depositing said particles comprises depositing a first type of particle onto the band-shaped moving carrier (3) and subsequently depositing a second type of particle onto the band-shaped moving carrier (3) downstream thereof and over the first type of particle.

12. Process of claim 1, wherein the particles are non-uniformly deposited throughout a thickness of the surface covering.

13. Process to manufacture a substrate-free decorative surface covering having a relief-like appearance, said process comprising the steps of:
    manufacturing a colored polymer-based sheet,
    cutting said sheet into particles,
    scattering said particles onto a band-shaped moving carrier, the band-shaped moving carrier being part of a production device,
    downstream of said scattering of said particles onto said band-shaped moving carrier, depositing a polymer based substantially pigment-free and substantially filler-free powder onto said particles, so that said powder covers said particles and fills the space or interstices between said particles; and
    heat treating said particles and said substantially pigment-free and substantially filler-free powder and compacting them in a press to form said surface covering, said heat treatment transforming said powder into a transparent or translucent matrix in which the unfused and discrete particles are dispersed and embedded throughout the thickness of said transparent or translucent matrix with a density gradient such that the particles have a lower density towards the top surface of the transparent or translucent matrix and a higher density towards the bottom surface of the transparent or translucent matrix.

14. Process to manufacture a substrate-free decorative surface covering having a relief-like appearance, said process comprising the steps of:
    manufacturing a colored polymer-based sheet,
    cutting said sheet into particles,
    scattering said particles onto a band-shaped moving carrier, the band-shaped moving carrier being part of a production device,
    downstream of said scattering of said particles onto said band-shaped moving carrier, depositing a polymer based substantially pigment-free and substantially filler-free powder onto said particles, so that said powder covers said particles and fills the space or interstices between said particles; and
    heat treating said particles and said substantially pigment-free and substantially filler-free powder and compacting them in a press to form said surface covering, said heat treatment transforming said powder into a transparent or translucent matrix in which the unfused and discrete particles are dispersed and embedded throughout the thickness of said transparent or translucent matrix such that the particles are more sparsely dispersed towards the top surface of the transparent or translucent matrix and more densely dispersed towards the bottom surface of the transparent or translucent matrix, the more sparse dispersion of the particles towards the top surface enabling the more dense dispersion of the particles towards the bottom surface to be viewed.

\* \* \* \* \*